_United States Patent_ [19]

Mansouri

[11] 4,123,362
[45] Oct. 31, 1978

[54] PRESSURIZED SEAL SUCH AS FOR DRUM SCREENS
[75] Inventor: Hosein Mansouri, New Berlin, Wis.
[73] Assignee: Rexnord Inc., Milwaukee, Wis.
[21] Appl. No.: 847,960
[22] Filed: Nov. 2, 1977
[51] Int. Cl.$^2$ ............................................. B01D 33/34
[52] U.S. Cl. .................................... 210/232; 210/402; 210/406; 210/416 R
[58] Field of Search ............... 210/394, 402, 403, 404, 210/416 R, 406, 161, 210, 212, 216, 217, 232

[56] References Cited
U.S. PATENT DOCUMENTS
2,894,635   7/1969   Irthum et al. ........................ 210/402

Primary Examiner—Frank Sever

[57] ABSTRACT

The specification discloses an improvement in rotary screening apparatus for the filtration of liquids and especially water. Such apparatus comprises (a) a stationary structure including a delivery channel for the feed water and a screened water holding tank wherein a lower elevation of screened water is maintained and (b) a screen drum disposed to receive feed water from the channel and to rotate within the tank on a horizontal axis with the uppermost section of its cylindrical surface above the feed for cleaning purposes. The improvement resides in a seal between the holding tank and the drum which provides improved protection against leakage and utilizes a flow of screened water which drives the feed water away from the seal if and wherever there may be a leak.

6 Claims, 5 Drawing Figures

4,123,362

PRESSURIZED SEAL SUCH AS FOR DRUM SCREENS

FIELD OF THE INVENTION

This invention relates generally to rotary drum apparatus for the screening of liquids such as are used in water treatment, sewage treatment, and industrial waste treatment. In particular, the invention relates to an improved seal between the rotary drum and the holding tank in which it is mounted. U.S. Pat. No. 4,038,187 is directed to improvements in such a drum.

SUMMARY OF THE INVENTION

The subject seal provides positive protection against leakage of unscreened liquid from the interior of the rotary drum, past the interface between the drum and the holding tank, and into the filtrate or screened liquid in the holding tank. The seal contains a distribution chamber for screened liquid or its equivalent and comprises spaced, parallel wiping flanges between which the liquid is forced through a series of ports opening from the distribution channel. More particularly, a rotary seal assembly is provided for a drum screen or the like. The assembly includes a rotating ring having an internal, cylindrical wiping surface and a flexible, tubular element having flanges engaging said surface for closing the space between the stationary and rotating parts of the drum screen or the like. The assembly includes a ring which rotates with the screen drum and in part extends above the feed and filtrate which are to be separated and a portion of the filtrate is carried under pressure by the element to keep the feed from contaminating the filtrate.

BRIEF DESCRIPTION OF THE DRAWINGS

FIG. 4 is a transverse sectional view showing the seal positioned between the rotary drum and the holding tank.

DETAILED DESCRIPTION OF THE PREFERRED EMBODIMENT

Figure 1:
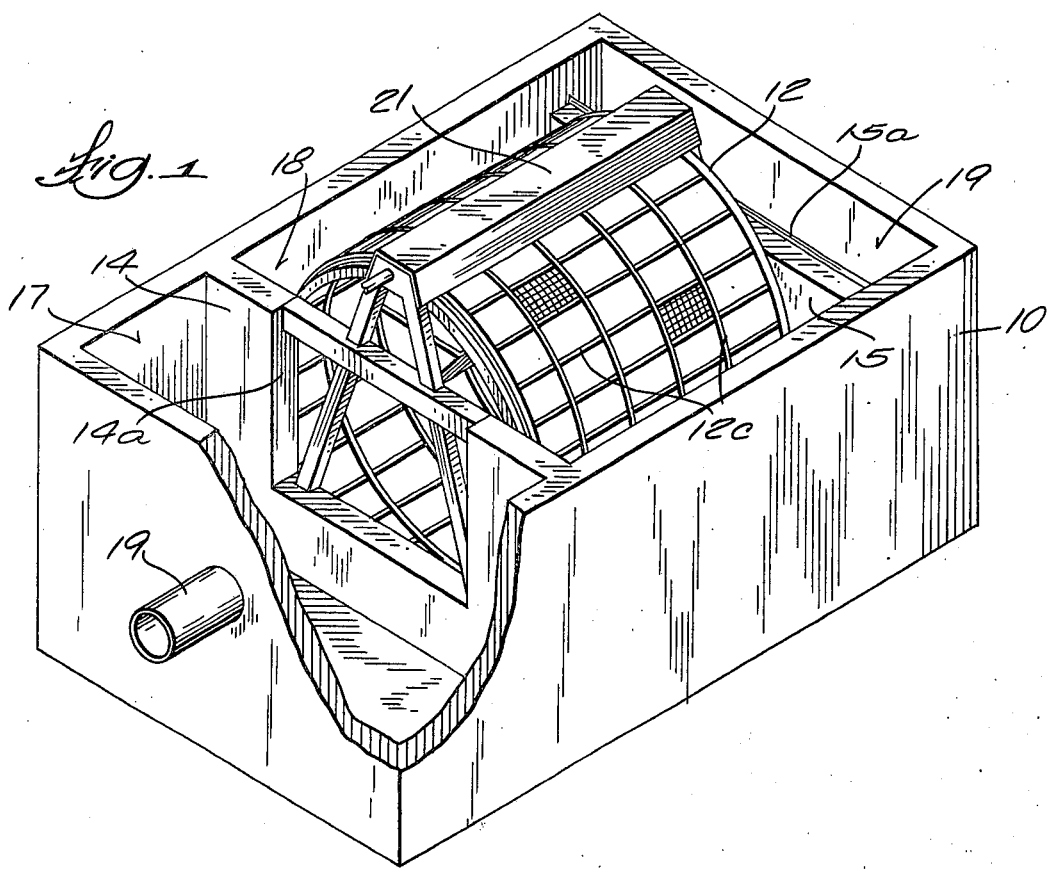
FIG. 1 is a perspective view of a rotary drum screen incorporating the subject invention and which is similar to that shown in U.S. Pat. No. 4,038,187.

The rotary drum screen shown in FIG. 1 includes the stationary tank structure 10 and the rotary, cylindrical drum 12. The interior walls 14 and 15 of structure 10 are spaced to divide the structure into three chambers, namely the feed well 17, the drum well 18 and the outlet well 19. The cylindrical drum 12 is supported for rotation in well 18 and has a closed end adjacent to wall 15. The open end 12a of drum 12 adjoins the opening 14a of wall 14 and the feed received from pipe 19 and discharging into well 17 passes through the openings 14a and 12a into the chamber 12b of drum 12. The outer cylindrical structure of drum 12 includes the removable screen panels 12c which carry the screening through which the water passes. The screened water or filtrate enters and is maintained at a given level in drum well 18 as determined by the height of weir 15a extending across the top of wall 15. The filtrate passing over weir 15a into well 19 is discharged through a conduit, not shown.

The level of the feed in well 17 and the drum chamber 12b is necessarily always somewhat higher than in the drum well 18 because of the headloss in flowing through the drum screening. A means for controlling the level of the feed is disclosed in U.S. Pat. No. 4,038,187.

The rotary drum screen as shown also includes backwash means 21 extending over drum 12 and a backwashing receiving trough within the drum and above the elevation of weir 15a. U.S. Pat. No. 4,038,187 discloses a preferred backwash system and also a drive and control means for rotating the drum.

Figure 2:
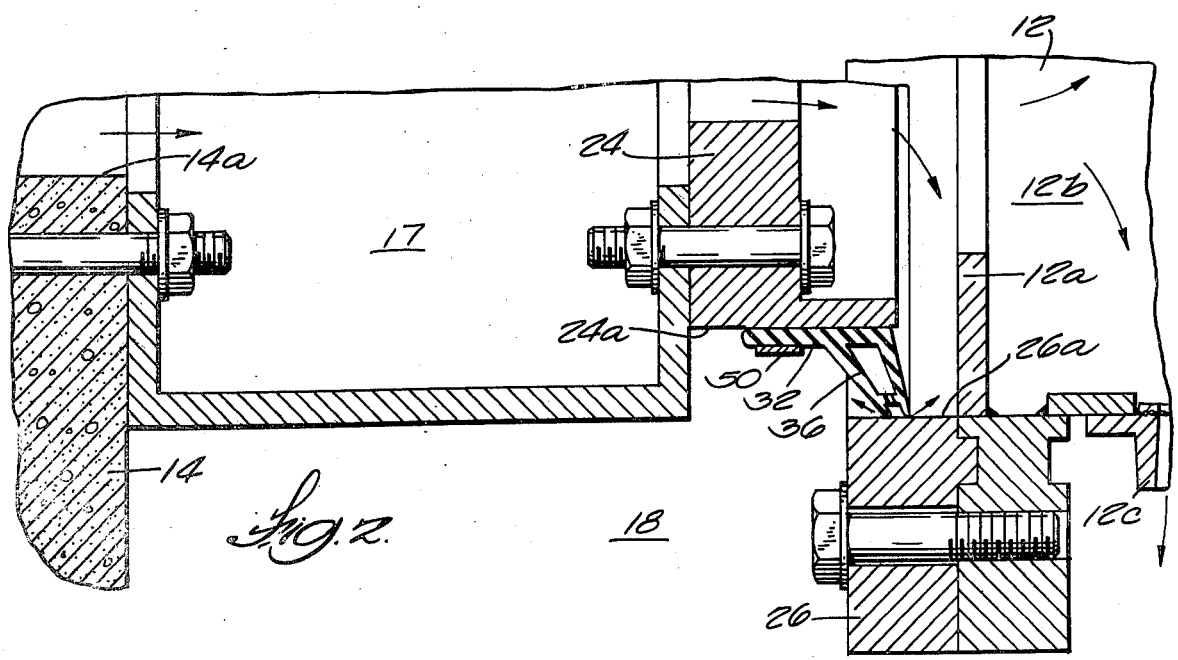
FIG. 2 is a longitudinal sectional view showing the seal positioned between the rotary drum and the holding tank.

A frame 22 within chamber 18 is bolted to wall 14 and extends around opening 14a. A portion of this frame is shown in FIG. 2; frame 22 provides the support for the seal mounting ring 24 which is surrounded by the sealing ring 26 of drum 12. Ring 26 is bolted to drum 12 as shown in FIG. 2 and rotates with the drum. As shown, in a typical drum screen, the upper portions of the drum 12 including ring 26 and also of the seal mounting ring 24 extend above the tank structure 10 and the water levels in either well 17 or 18.

In the past, it has been conventional to provide a simple wiping seal on ring 24 to engage the cylindrical inner surface of ring 26. However, due primarily to inevitable tolerance variations in the construction of the stationary tank structure 10 and the drum 12, such seals have permitted small but significant amounts of unscreened water to flow directly into the drum well 17 without first passing through the screening of drum 12.

According to the subject invention, an improved wiping seal 32 is mounted on the outer cylindrical surface 24a of the mounting ring 24. The seal 32 comprises a flexible, elongate element including a tubular body 34 defining a distribution chamber 36 having opposite ends 38 and 40; spaced, parallel wiping flanges 42 and 44 extending from the body 34 and in wiping engagement with the sealing surface 26a of the ring 26; a series of ports 46 (best seen in FIG. 4) in the body 34 opening from the chamber 36 between the flanges 42 and 44; means 48 closing the ends 38 and 40 of the distribution chamber 36 at one or both ends thereof; and strap means 50 securing the body 34 to the surface 24a of the ring 24 with the opposite ends 38 and 40 of the distribution chamber 36 above the liquid levels referred to. An inlet pipe 52 connected to a source (not shown) of screened water or its equivalent preferably joins both closure means 48 as shown to supply both ends of chamber 36 with screened water or its equivalent at a rate which prevents unscreened water from passing the seal 32 where wiping engagement may not occur.

Figure 5:
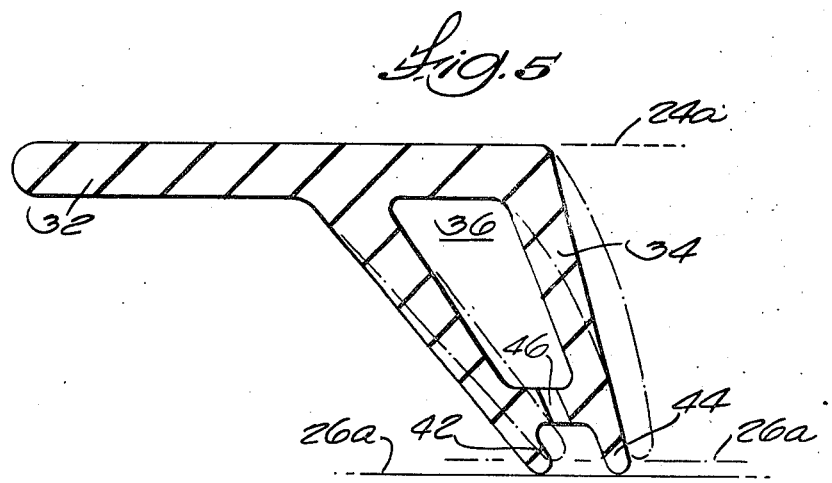
FIG. 5 is a schematic transverse sectional view showing the variations in shape of the seal during rotational motion of the drum.
Figure 1:
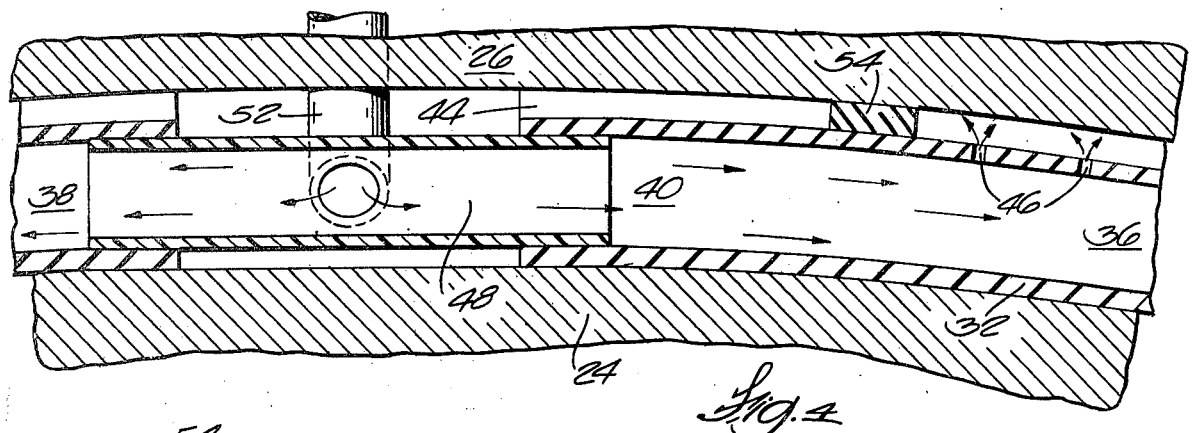
Figure 3:
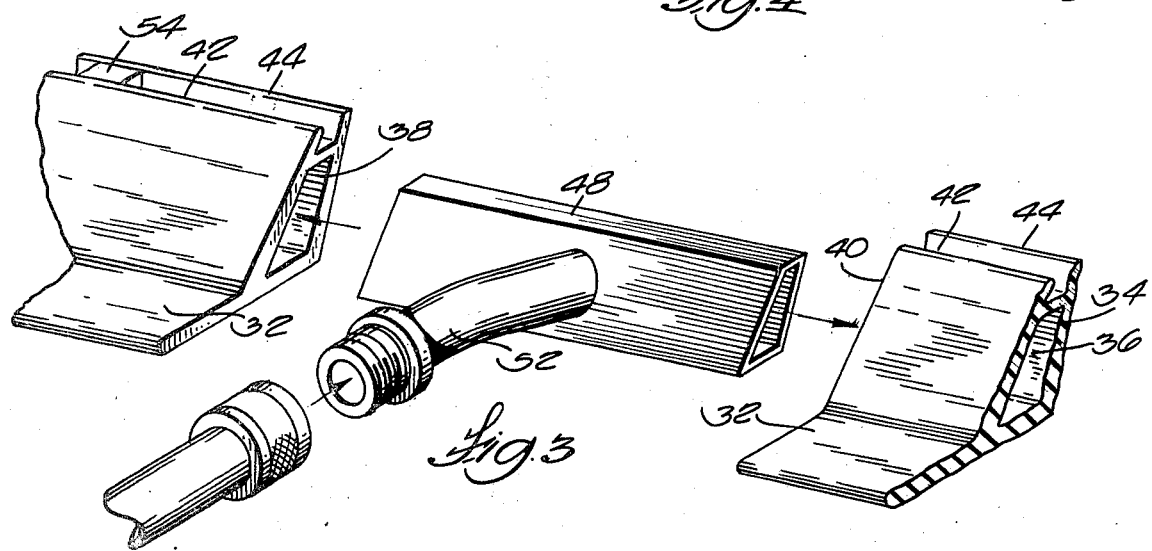
FIG. 3 is a perspective, fragmentary view of the inlet portion of the seal.

The tubular body 34 is of trapezoidal section, as shown, with the wiping flanges 42 and 44 extending from the smaller parallel side of the trapezoid and the smaller parallel side of the trapezoid being axially offset from the longer parallel side of the trapezoid toward drum 12 because the level of the water in the drum chamber 12b is higher than the level of the water in the drum well 18. This construction permits the longer non-parallel side of the trapezoid to pivot and the shorter non-parallel side to bow outwardly as shown in FIG. 5 to compensate for variations in the annular space between the seal ring 26 and the seal mounting ring 24.

Screened water or its equivalent entering the chamber 36 via the means 48, flows through the ports 46 and into the annular groove defined by the wiping flanges 42 and 44 at a pressure slightly in excess of the pressure of the water on either side of the seal. Whenever wiping contact between the wiping flange 42 and 44 and the sealing surface 26a of the ring 26 is interrupted for any reason, the water then flows axially over surface 26a both with and against the pressure of the ambient water, thereby positively assuring that unscreened water from the interior of the drum 12 cannot flow past the seal 32 and into the drum well 18. The water pressure in the annular groove is maintained and the cross-section of chamber 36 is relatively large so that the water can flow in it relatively freely, which it cannot do in the relatively small annular groove.

The seal 32 is most readily formed as an extrusion which is cut to the required length. The ports 46 are then drilled in the body 34 between flanges 42 and 44 as required. No ports are required above the highest water level or above the tank structure 10, but may be provided. However, small, soft-rubber plugs 54 or the like are desirably bonded to the seal 32 to close the ends of the small annular groove defined by the flanges 42 and 44 and between the body 34 of the seal and the wiping surface 26a of seal ring 26.

While the present invention has been illustrated by a detailed description of a preferred embodiment thereof, various embodiments of the invention may be employed within the scope of the following claims.

What is claimed is:

1. In a drum screen apparatus for screening raw water and the like and including a stationary structure including a raw water delivery channel and a screened water holding tank wherein a given elevation of screened water is maintained and further including a drum disposed to receive water from said channel and to rotate within said tank on a horizontal axis with the uppermost section of its cylindrical surface above said elevation for cleaning purposes, said structure and said drum having interfacing sealing surfaces, said structure having a wiping seal mounted on its sealing surface so as to engage the sealing surface on said drum and prevent any passage of raw water therebetween from said channel into said tank, an improved wiping seal for said apparatus comprising (A) a flexible, elongated element including (1) a tubular body defining a distribution chamber having opposite ends, said body being of trapezoidal section and having larger and smaller parallel sides and two converging sides, (2) spaced, parallel wiping flanges extending from the two converging sides and in wiping engagement with the sealing surface of said drum, (3) a series of ports in the smaller side and between said flanges and opening from said chamber, (B) means closing said opposite ends of said distribution chamber, (C) a clean water supply connection opening into said chamber at one or both of said opposite ends thereof and (D) means securing the larger side to the sealing surface on said structure with said opposite ends adjoining each other above said elevation and so that the smaller side is axially offset toward said channel such that the larger side pivots and the smaller side cooperatively bows outwardly to compensate for variations in the annular space between the sealing surfaces, said seal being adapted to be supplied with clean water at a pressure which prevents raw water from passing said seal where such wiping engagement may not occur.

2. In the apparatus of claim 1, the improved seal as described wherein said means closing said ends of said distribution chamber comprise: a conduit disposed intermediate and having opposite ends fitted in said ends of said distribution chamber.

3. In the apparatus of claim 1, the improved seal as described wherein said means closing said ends of said distribution chamber comprise relatively soft rubber plugs.

4. In the apparatus of claim 1, the improved seal as described wherein said tubular body is of a trapezoidal section with said wiping flanges extending from its smaller parallel side, which is axially offset from its opposite parallel side toward the higher pressure of said delivery channel.

5. In a drum screen apparatus for screening a liquid, said apparatus comprising:
   (a) a stationary structure comprising:
      (i) a liquid delivery channel,
      (ii) a screened liquid holding tank, and
      (iii) means for maintaining a pre-determined elevation of screened liquid in said holding tank;
   (b) a screening drum disposed to receive liquid from said delivery channel and to rotate within said tank, said structure and said drum having interfacing sealing surfaces; and
   (c) a wiping seal mounted on one or the other of said interfacing sealing surfaces to prevent passage of unscreened liquid from said delivery channel into said holding tank,
the improvement wherein said wiping seal comprises:
   (d) a tubular body of trapezoidal section and having converging larger and smaller sides such that the larger sides pivot and the smaller sides cooperatively bow outwardly to compensate for variations in the annular space between the sealing surfaces, said body defining a distribution chamber and having a series of ports leading from said distribution chamber into an annular groove to be recited;
   (e) spaced, wiping flanges extending from said two sides and defining an annular groove therebetween, said wiping flanges normally being in wiping engagement with the one of said interfacing sealing surfaces on which said wiping seal is not mounted; and
   (f) means for supplying screened liquid or its equivalent to said distribution chamber at a pressure which prevents liquid from passing said seal where one or the other or both of said wiping flanges are not in wiping engagement with said one of said interfacing sealing surfaces.

6. In the apparatus of claim 5, the further improvement wherein said means for supplying screened liquid or its equivalent to said distribution chamber comprises a conduit disposed intermediate the ends of said tubular body and having opposite ends fitted into the adjoining ends of said distribution chamber.

* * * * *